(12) United States Patent
Auerbach

(10) Patent No.: US 7,244,479 B2
(45) Date of Patent: *Jul. 17, 2007

(54) SEALING STRIP COMPOSITION

(75) Inventor: Melvin Auerbach, Twinsburg, OH (US)

(73) Assignee: Seal-OPS, LLC, Tenafly, NJ (US)

( * ) Notice: Subject to any disclaimer, the term of this patent is extended or adjusted under 35 U.S.C. 154(b) by 113 days.

This patent is subject to a terminal disclaimer.

(21) Appl. No.: 10/744,748

(22) Filed: Dec. 23, 2003

(65) Prior Publication Data

US 2004/0149370 A1 Aug. 5, 2004

Related U.S. Application Data

(63) Continuation-in-part of application No. 09/757,614, filed on Jan. 11, 2001, now Pat. No. 6,686,002.

(51) Int. Cl.
*E06B 3/00* (2006.01)

(52) U.S. Cl. .................. 428/34; 428/440; 428/492; 428/497; 428/913; 524/261; 524/262; 524/399

(58) Field of Classification Search .................. 428/34, 428/440, 492, 497, 913; 524/261, 262, 399
See application file for complete search history.

(56) References Cited

U.S. PATENT DOCUMENTS

| | | | | |
|---|---|---|---|---|
| 3,654,005 A | 4/1972 | Higgins et al. | ............. | 156/108 |
| 3,771,276 A | 11/1973 | Stewart et al. | ................. | 52/172 |
| 4,109,431 A | 8/1978 | Mazzoni et al. | ............... | 52/172 |
| 4,145,237 A | 3/1979 | Mercier et al. | ............. | 156/107 |
| 4,198,254 A | 4/1980 | Laroche et al. | ............. | 156/107 |
| 4,215,164 A | 7/1980 | Browser | ...................... | 428/34 |
| 4,348,435 A | 9/1982 | Mistrick et al. | ............... | 428/34 |
| 4,431,691 A | 2/1984 | Greenlee | ....................... | 428/34 |
| 4,440,829 A | 4/1984 | Gerace et al. | ............... | 428/343 |
| 4,614,676 A | 9/1986 | Rehfeld | ........................ | 428/34 |
| 4,622,249 A | 11/1986 | Browser | ....................... | 428/34 |
| 4,817,354 A | 4/1989 | Bayer | .......................... | 52/302 |
| 4,904,732 A | 2/1990 | Iwahara et al. | ............... | 525/100 |
| 4,942,704 A | 7/1990 | King | ............................ | 52/171 |
| 4,952,430 A | 8/1990 | Browser et al. | ............... | 428/34 |
| 4,994,309 A | 2/1991 | Reichert et al. | ............... | 428/34 |
| 5,033,249 A | 7/1991 | Scheeren et al. | ............... | 52/790 |
| 5,088,258 A | 2/1992 | Schield et al. | ................ | 52/398 |
| 5,114,658 A | 5/1992 | Katsaros | ..................... | 264/537 |
| 5,162,445 A | 11/1992 | Powers et al. | ........... | 525/333.4 |
| 5,177,916 A | 1/1993 | Misera et al. | ................. | 52/172 |
| 5,254,377 A | 10/1993 | Lingermann | ............... | 428/34.1 |
| 5,484,477 A | 1/1996 | George et al. | .............. | 106/499 |
| 5,632,122 A | 5/1997 | Spinks | ........................ | 52/172 |
| 5,786,414 A | 7/1998 | Chikuni et al. | ............. | 524/413 |
| 5,851,609 A | 12/1998 | Baratuci et al. | .............. | 428/34 |
| 5,855,972 A | 1/1999 | Kaeding | ....................... | 428/34 |
| 6,491,992 B1 * | 12/2002 | Koizumi et al. | ............. | 428/34 |
| 2005/0003117 A1 * | 1/2005 | Wang et al. | .................. | 428/34 |

FOREIGN PATENT DOCUMENTS

EP 1384127 8/1972

* cited by examiner

*Primary Examiner*—Peter D. Mulcahy
(74) *Attorney, Agent, or Firm*—Arnold D. Litt; Herten, Burstein, Sheridan, Cevasco, Bottinelli, Litt & Harz, L.L.C.

(57) ABSTRACT

The inventions relates to a composition adapted for use as a sealing strip in the manufacture of insulating structures. The composition includes an adhesion promoter compound of at least two components, a polymeric base material(s), and a cross linking agent(s). The invention further relates to an insulating structure including first and second panes with the sealing strip positioned therebetween.

18 Claims, 1 Drawing Sheet

SEALING STRIP COMPOSITION

CROSS REFERENCE TO RELATED APPLICATION

This application is a continuation in part of U.S. patent application Ser. No. 09/757,614, filed Jan. 11, 2001, entitled "Sealing Strip Composition", which is now U.S. Pat. No. 6,686,002.

BACKGROUND OF THE INVENTION

1. Field of the Invention

The invention relates to a sealing strip used in the construction of insulating, double pane structures. More particularly, the invention relates to a sealing strip composition comprised of an adhesion promoter compound of at least two components, a polymeric base material(s), a cross linking agent(s), fillers, molecular sieves, plasticizers and tackifier.

2. Description of the Prior Art

Various sealing structures have been developed for use in the fabrication of insulating glass structures. These sealing structures are generally positioned between adjacent panes and act to maintain the panes in a spaced relationship. The sealing structure must also prevent the passage of undesirable materials within the space defined between the adjacent panels. The passage of, for example, water vapor, leads to the formation of undesirable condensation between the panes. Once such condensation has made its way within the space between the panes, the double pane becomes unuseable.

With this in mind, a sealing structure must be optimized to maintain the spacing between the panes, adhere to the surface of the panes so as to create a barrier to the passage of vapor between the sealing structure and the pane, and be substantially impermeable to vapor through the sealing structure itself. A variety of sealing structures are known to exist, but each is known to possess shortcomings requiring modification of the base sealing material through the inclusion of various structural additives such as spacers and vapor barriers.

For example, and with reference to U.S. Pat. No. 5,855,972 to Konrad H. Kaeding, a sealant strip for use in the fabrication of insulating glass is disclosed. In the '972 patent, Kaeding provides examples of using a deformable sealant strip to manufacture insulating glass for use in window systems. Although he makes some strides in overcoming previous deficiencies in analogous systems, he fails to completely resolve the issues of simplicity, resistance to compression, good adhesion and ease of manufacture. He gives many examples of "grafting polymers onto the backbone of the Exxon Exxpro polymers", but he does not obtain the desired product without further manipulation. However, Kaeding was not able to resolve all issues and obtain the optimum synergy.

Kaeding claims to provide excellent adhesion, but offers no data. He claims to have a system that is resistant to compression, but uses "staples" within the sealant strip to maintain the desired dimensions and to prevent compression. In addition, he discusses the use of plastic and/or metal vapor barriers to prevent the ingress of water and other external materials into the cavity of the insulating glass unit. He also uses several complex "curing" systems.

All these issues are overcome in accordance with the present invention by the simple use of polymers and a dual curing/adhesion promoting system. The present invention overcomes these deficiencies with a simplified cross-linking system to prevent compression which occurs over a period of time and a grafting of adhesion promoters, preferably of the silane type, onto the backbone of the Exxon polymers.

Also, in one embodiment of the present invention the present sealing system takes advantage of using a liquid adhesion promoter, such as a silane compound, and a liquid cross-linking agent, both of which facilitate the ease of incorporating these materials into the elastomer matrix to provide a far more homogeneous product.

SUMMARY OF THE INVENTION

It is, therefore, an object of the present invention to provide a composition adapted for use as a sealing strip in the manufacture of insulating structures. The composition includes an adhesion promoter comprised of a first component and a second component, wherein the relationship between the first and second components increases adhesion properties. The composition also includes a polymeric base material, at least one cross linking agent and tackifier.

It is also an object of the present invention to provide a composition wherein the first and second components of the adhesion promoter are independently chosen from the group consisting of acetoxysilanes, alkoxysilanes, epoxysilanes, silane-esters, methacryloxysilanes, organopolysiloxanes, organosilanes, organosilanols, vinylsilanes, organoaminosilanes, polysulfidesilanes, mercaptosilanes, ureidosilanes, and combinations thereof.

It is another object of the present invention to provide a composition wherein the first and second components of the adhesion promoter are independently chosen from the group consisting of bis-(triethoxysilylpropyl)disulfied, bis-(triethoxysilylpropyl)tetrasulfide, gamma-aminopropyltriethoxysilane, gamma-glycidoxy-propyltrimethoxysilane, gamma-mercaptopropyltriethoxysilane, gamma-mercaptopropyltrimethoxysilane, gamma-methacryloxypropyltriethoxysilane, gamma-methacryloxypropyltrimethoxysilane, gamma-ureidopropylltrimethoxysilane, methyltris(isopropenoxy)silane, -beta-(aminoethyl)-gamma-aminopropyltrimethoxysilane, (N,N-Dimethyl-3-aminopropyl)silane, polydimethylsiloxane, vinyltriethoxysilane, or a combination thereof.

It is a further object of the present invention to provide a composition wherein the first component of the adhesion promoter is N-beta-(aminoethyl)-gamma-aminopropyltrimethoxysilane and the second component of the adhesion promoter is gamma-mercaptopropyltrimethoxysilane.

It is still another object of the present invention to provide a composition wherein the at least one cross linking agent is chosen from the group consisting of divalent metal oxides, divalent salts of organic fatty acids, organic fatty acids, zinc oxide, zinc stearate, stearic acid, zinc octoate, tin octoate, calcium stearate or a mixture thereof.

It is also an object of the present invention to provide a composition wherein the at least one cross linking agent is zinc octoate.

It is also another object of the present invention to provide a composition wherein the at least one cross linking agent is in a mixable form, such as a liquid or a powder.

It is a further object of the present invention to provide a composition including a filler, molecular sieve and a plasticizer.

It is another object of the present invention to provide a composition wherein the filler is an inert filler.

It is still a further object of the present invention to provide a composition wherein the filler is a talc and/or carbon black compound.

It is also an object of the present invention to provide a composition wherein the composition is a hot melt adhesive.

It is still another object of the present invention to provide a method for improving the adhesion properties of a composition comprising a polymeric base material, at least one cross linking agent, and tackifier, adapted for use in the manufacture of insulating structures. The method is achieved by including an adhesion promoter comprised of a first component and a second component in the composition, wherein the relationship between the first and second components increases adhesion properties.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
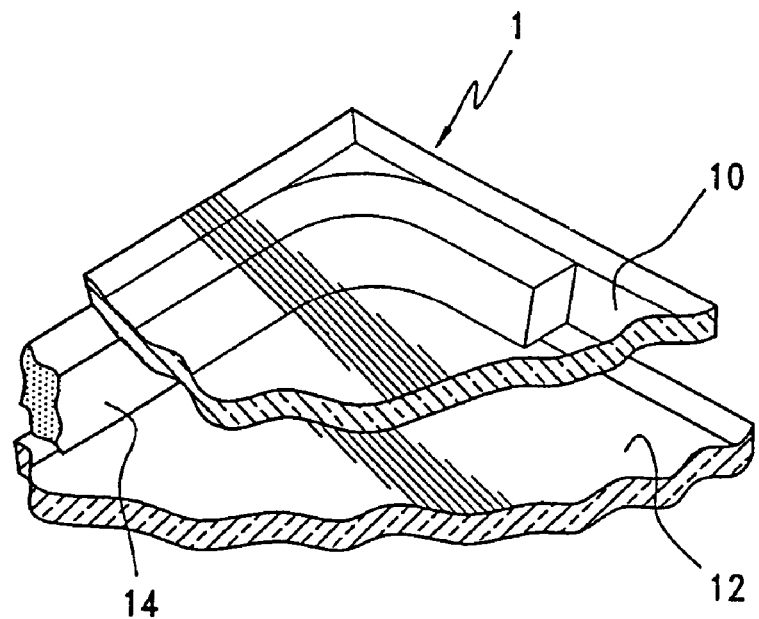
FIG. 1 is a partial perspective view of a glass double pane structure in accordance with the present invention.
Figure 2:
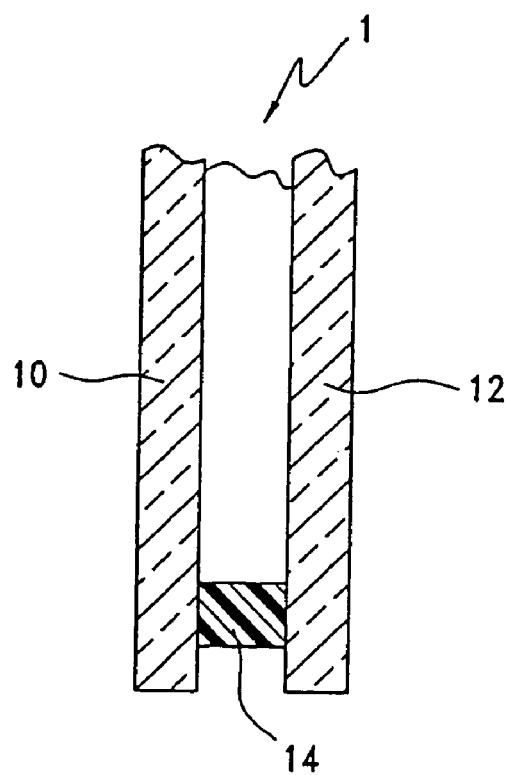
FIG. 2 is a cross sectional view of a glass double pane structure in accordance with the present invention.

With reference to FIGS. 1 and 2, an insulating glass structure 1 incorporating a sealing strip 14 providing separation of adjacent panes 10, 12 and sealing of the space therebetween is shown. As those skilled in the art will readily appreciate, the inventive concepts of the present sealing strip 14 may be applied in various manners without departing from the spirit of the present invention. For example, it is contemplated that the present sealing strip may be used in conjunction with other materials, for example, various types of glass, including, clear float glass, annealed glass, tempered glass, solar glass, tinted glass, and Low-E glass, acrylic sheets and polycarbonate sheets.

In accordance with the present invention, the sealing strip 14 is applied in the construction of a double pane glass structure. The insulating glass structure, therefore, generally includes a first pane 10 and a second pane 12 separated by a sealing strip 14 positioned between the first pane 10 and the second pane 12. The use of a sealing strip 14 in accordance with the present invention provides improved adhesion, vapor barrier characteristics and compression resistant characteristics. As a result, the present sealing strip 14 may be readily formed and applied without the need for supplemental vapor barriers and spacers commonly found in prior art sealing devices.

Vapor barriers are generally used in prior art devices when the sealant system does not have a good moisture vapor transmission rate, that is, it allows moisture to travel through the sealant at a rate that would allow too much moisture into the air space between the panes causing condensation between the panes. These vapor barriers may also be used as mechanical spacers to maintain a certain thickness of airspace in the window. The present sealing strip offers excellent moisture vapor transmission rates. In addition, the rheology of the composition is such that due to controlled internal cross linking of the materials, the sealing strip will withstand attempts for compression and it will maintain the air space with no additional help from a supplemental vapor barrier spacer. The theoretical cross linking agent in accordance with a preferred embodiment of the present invention is disclosed below.

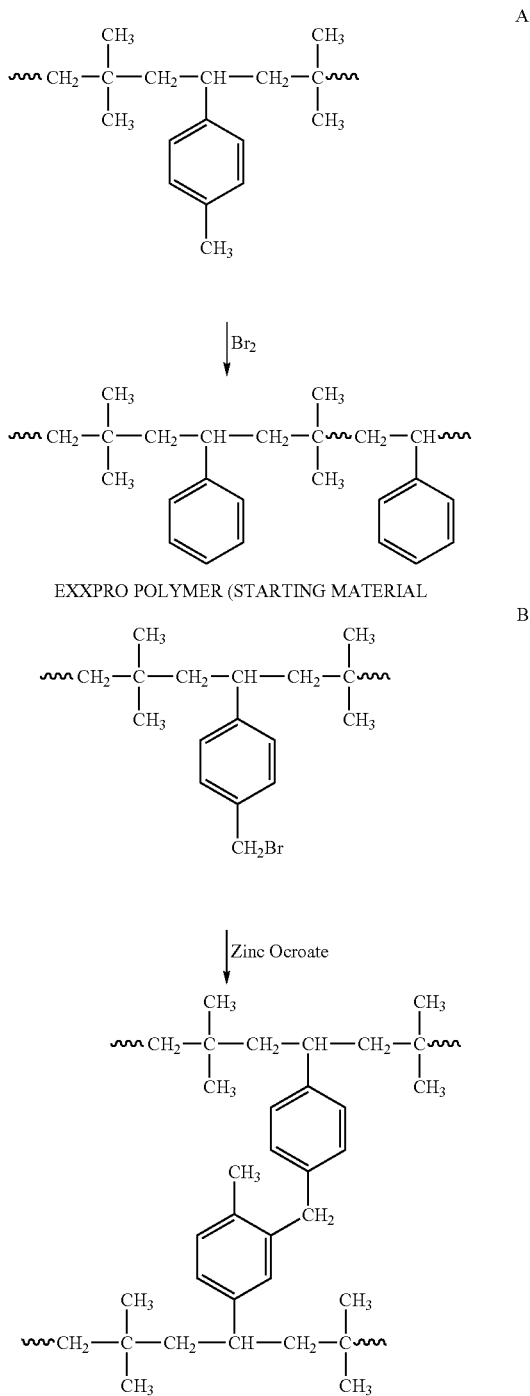

The preferred material prepared by the use of an adhesion promoter and the cross linking agent provides the unique property which allows only minimal compression set when put under constant stress due to the cross linking of the material. If one uses too great a quantity of either material, one can get less than 0.001 inch of compression set. However, this makes the material very tough and almost impossible to handle. In addition, when such material is used to manufacture an insulating glass unit the adhesion to glass is reduced. It is only through the unique combination of the correct amount of adhesion promoter, such as silane(s), and cross linking agents that one is capable of obtaining a material which is handable, gives good adhesion and resists compression set. Indeed, previously unknown dramatic synergistic effects between two or more adhesion promoters results in substantial enhancement of adhesive strength as illustrated in the examples below.

In addition, this reinforcing can be further enhanced by the use of appropriate fillers as seen in the formulation. This allows the formulator a third alternate in controlling the resistance to compression.

When put under a constant pressure of 30 pounds per square inch for weeks at a time, the compression set is less than 0.030 inch.

The sealing strip in accordance with the present invention is generally comprised of an adhesion promoter composed of at least two components, a polymeric base material(s), a cross linking agent(s), plasticizers (or oils or diluents), fillers, molecular sieves and tackifier. The use of a cross linking agent and adhesion promoter in combination with tackifier results in a sealing strip offering improved compression and adhesion characteristics. This allows the sealing strip to be used in the fabrication of insulating glass structures without the need for additional spacers and vapor barriers.

In accordance with a preferred embodiment of the present invention, the adhesion promoter(s) comprises approximately 0.25-7.00% by weight, and preferably approximately 0.50-2.50% by weight, of the sealing strip composition. While the use of a single component adhesion promoter produces a useful product, the present invention is greatly improved through implementation of two or more components. The components of the adhesion promoter are chosen from the group consisting of acetoxysilanes, alkoxysilanes, epoxysilanes, silane-esters, methacryloxysilanes, organopolysiloxanes, organosilanes, organosilanols, vinylsilanes, organoaminosilanes, polysulfidesilanes, mercaptosilanes, ureidosilanes, or a combination thereof. Specific examples include bis-(triethoxysilylpropyl)disulfied, bis-(triethoxysilylpropyl)tetrasulfide, gamma-aminopropyltriethoxysilane, gamma-glycidoxy-propyltrimethoxysilane, gamma-mercaptopropyltriethoxysilane, gamma-mercaptopropyltrimethoxysilane, gamma-methacryloxypropyltriethoxysilane, gamma-methacryloxypropyltrimethoxysilane, gamma-ureidopropylltrimethoxysilane, methyltris(isopropenoxy)silane, -beta-(aminoethyl)-gamma-aminopropyltrimethoxysilane, (N,N-Dimethyl-3-aminopropyl)silane, polydimethylsiloxane, vinyltriethoxysilane, or a combination thereof. Organoaminosilanes have proven to be preferred components of the adhesion promoter for use in accordance with the present invention. As discussed below with reference to the experimental results presented, utilizing more than a single component produces greater adhesion properties than would otherwise be obtained. In accordance with a preferred embodiment, the present invention is implemented using two different silane components as the adhesion promoter. Use of N-beta-(aminoethyl)-gamma-aminopropyltrimethoxysilane as the first component and gamma-mercaptopropyltrimethoxysilane as the second component has resulted in particularly desirable experimental results as discussed below.

The polymeric base material comprises greater than approximately 10%, preferably approximately 15-40%, and most preferably approximately 15-25%, by weight of the sealing strip composition. The polymeric base material is composed of compounds comprising polyisobutylene/polyisoprene copolymers (e.g., Exxon Butyl), polyisobutylene polymers (e.g. Exxon Vistanex), brominated olefin polymers (e.g., Exxon Exxpro) and petroleum hydrocarbon oil.

The cross linking agent comprises approximately 0.25-5.00% by weight, and preferably, approximately 0.50-2.50% by weight, of the sealing strip composition. The cross linking agent is chosen from the group consisting of divalent metal oxides, divalent salts of organic fatty acids, organic fatty acids, zinc oxide, zinc stearate, stearic acid, zinc octoate (solution and/or solid), tin octoate and calcium stearate in an appropriate form (e.g., liquid or powder).

Where zinc oxide is used it usually needs accelerators such as sulfur compounds and complex vulcanization systems. While specific accelerators are disclosed above in accordance with a preferred embodiment of the present invention, there are many other known accelerator systems which may be used in accordance with the present invention. The salts of calcium, tin and zinc used in accordance with the present invention also require accelerator systems.

In accordance with a preferred embodiment of the present invention, and as discussed below with reference to the various examples presented, zinc octoate solution is a preferred cross linking agent for use in accordance with the present invention. In addition, it has been found that approximately a 17-19% zinc octoate solution works better than 100% solid zinc octoate in accordance with preferred embodiments of the present invention. While the use of accelerators is described above with reference to a preferred embodiment of the present invention, those skilled in the art will appreciate that the present invention may be practiced without the use of accelerators.

In one embodiment of this invention, the tackifier forms less than 10% by weight of the sealing strip composition. The tackifier is chosen from the group consisting of organic monomers, oligomers and polymers, hydrogenated C5 and C9 resins, C5 hydrogenated resins, polyterpene resins, pentaerythritol esters of hydrogenated wood resins, phenolic polyterpene resins, alpha pinene resins, dipentene resins, hydrogenated C5 esters, cycloalkene resins, phenol-aldehyde resins, rosin acids and esters, dipentene resins, petroleum hydrocarbon resins, and alkyl aromatic hydrocarbon resins. Preferred tackifiers include pentaerythritol esters of hydrogenated wood rosin and hydrogenated C5 hydrocarbons. The C5 hydrogenated hydrocarbon resin may be used alone or in combination with the pentaerythritol hydrogenated esters. These tackifiers can be used individually or in combination and can also be used as is or with a diluent, hydrocarbon oil or plasticizer. In accordance with a preferred embodiment of the present invention, and as discussed below with reference to the various examples presented, C5 hydrogenated resins are a preferred tackifier for use in accordance with the present invention.

In accordance with variations on the composition described above, it has been found that the replacement of molecular sieves with talc, or other inert fillers, results in a class of compounds generally referred to as hot melt adhesives. Such adhesive may also be used as an insulating glass sealant in a traditional aluminum spacer bar system with the same positional results described above. As to the other components of such a hot melt adhesive, the tackifier would remain substantially as with the sealing strip composition discussed above. In a preferred embodiment of the invention, the tackifier will be kept to less than 10% as disclosed above with regard to the sealing strip composition.

In forming an insulated glass unit, it is contemplated that the hot melt adhesive would be applied to a metallic spacer at approximately 250° F.-300° F. Once assembled, it is contemplated that the hot melt adhesive will provide adhesion properties and moisture vapor transmission rates substantially similar to those offered by the sealing strip composition discussed above. The hot melt adhesive will also resist compression (but since it is proposed for use with a spacer this is not a critical issue).

EXAMPLES

The sealing strip composition is formed in the following manner:

Equipment:

The equipment is generally referred to as a double arm horizontal sigma mixer. It can have variable speed and needs an external source of heat to control the temperature. It uses a jacket so hot water, steam or cold water can be run through the jacket to control the internal temperature. It can be vacuum rated but it is not necessary.

Procedure:

The following is a general procedure. The times and temperatures can vary somewhat depending on the size of the batch and the mixer used. As an example, it will take somewhat longer per addition for larger batches. If the temperature is lower than normal it will take longer to mix in. None of these are deleterious to the final product.

All ingredients are weighed out beforehand except the molecular sieves and the organo silane. They are weighed out just before use (otherwise both materials may absorb moisture from the atmosphere). The mixer is heated to approximately 225-250 degrees Fahrenheit (F.), the mixer is turned on and the masterbatch is added over a 10 minute period (the temperature is maintained between 225-250 degrees F. either by the use of the external heating mechanism or by heat of mixing when each ingredient is added).

The tackifiers are added one by one over a 5-15 minute period. These are preferably solid pellet or flake type materials which will melt in the mix at these temperatures. Mixing is continued until all tackifiers are melted and homogeneous. The hydrocarbon oil and filler are added alternately while maintaining a mix which is neither too thick and dry or too moist and wet. This can take 15-30 minutes and mixing is continued for 5-15 minutes after all the material is added. At this point the molecular sieves are added over 5-15 minutes and mixing is continued for an additional 15 minutes. The molecular sieves are white in color in comparison to the black material in the mixer so one can identify when the material is adequately mixed.

The temperature is taken periodically either by a temperature probe built into the mixer or by turning the mixer off after taking the temperature with an external thermometer.

After the molecular sieves are added, the material is cooled to 200 degrees F. before the silane and zinc octoate are added. After the silane and zinc octoate are added, it is mixed 30 minutes, the mixing blades are stopped and the material is removed.

Lap Shear Adhesion/Durometer Readings

Extensive studies of the adhesion of products manufactured in accordance with the present invention have been carried out by the Lap Shear Method, ASTM C-961 87 (reapproved 1992). As a reference point, several competitive butyl based sealant strips and hot melt products were tested from the marketplace and results were obtained in the range of 12-20 pounds per square inch (psi). Durometer readings are a way to measure the relative internal strength and resistance to compression. With the proper formulation, the adhesion could be optimized and maximized while obtaining a handable material that still had flexibility but did not flow or take a compression set.

The primary method for optimizing the adhesion properties is the inclusion of more than one component in the adhesion promoter. Synergy between the components dramatically affects the chemical composition of the present invention resulting in an increase in adhesion properties. Secondarily, chemical properties may be optimized by altering the concentrations of the adhesion promoter and the cross linking agent, controlling the resistance to compression. In one example, the concentration selected for zinc octoate allows for the optimization of the cross-linking concentration and the selected concentration of silane maximizes the adhesion. Thus we have been able to obtain adhesion values between 30-80 psi and can control the adhesion in the desired range by employing the method in accordance with the present invention. In addition, because of the unique chemistry of the polymeric material(s) and the zinc octoate crosslinking agent, the adhesive strength will improve with time.

The following examples serve to indicate the advantageous increase in adhesion when using more than one component in the adhesion promoter. These examples are intended to illustrate the invention without, however, limiting the scope thereof.

PREPARATION EXAMPLES

Preparation Example 1

A product was prepared according to the present invention utilizing a single silane component in the adhesion promoter. Following heating of a mixer, a masterbatch was added over a 10 minute period as described above. The masterbatch contained 8.21% by weight of Exxpro 3433 provided by ExxonMobil as the polymeric base material, 8.21% Vistanex MM L-80 provided by ExxonMobil, 6.11% Indopol H-300 Polybutene oil, and 0.73% Carbon Black N-330. The tackifiers, specifically 4.60% of Pentalyn G and 2.30% of Pentalyn H, both provided by Hercules, 0.73% Acetylene Black, and 8.48% Escorez 1315, provided by Exxon, were then added over a 5-15 minute period. Sunpar 2280 oil obtained from Sunoco was then added in the amount of 14.12% as the hydrocarbon oil alternately with 16.81% of the inert filler, Mistron Vapor R Talc provided by Luzenac, over 15 to 30 minutes. Following an additional 5-15 minutes of mixing, 7.27% of Molecular Sieve 3A and 2.52% of Molecular Sieve 13X, provided by UOP, were added in 5-15 minutes. The resultant material was then cooled to 200 degrees F. Upon reaching the desired temperature, 1.22% of the cross linking agent, Octoate Z (17-19%) provided by Vanderbilt, and 1.22% of the adhesion promoter, Silane A1120 (N(beta-aminoethyl) gamma-aminopropyltrimethoxy-silane), were added and mixed for 30 minutes. Studies of the final product seven days after creation, carried out by the Lap Shear Method, indicated an adhesion strength of 24.39 psi (pounds per square inch).

Preparation Example 2

A second product was prepared using a single silane component as the adhesion promoter. As in the example above, 40.74% by weight of masterbatch containing Exxpro 8433, Vistanex MM L-80, Indopol H-300 Polybutene oil, and Carbon Black N-330 was added to a heated mixer over a 10 minute period. Pentalyn G in the amount of 4.60%, 2.30% of Pentalyn H, 0.73% Acetylene Black, and 8.48% Escorez 1315 were then added over a 5-15 minute period. Sunpar 2280 oil in the amount of 14.12% was then added alternately with 16.81% of Mistron Vapor R Talc over 15 to 30 minutes. Following 5 to 15 minutes of mixing, 7.27% of Molecular Sieve 3A and 2.52% Molecular Sieve 13X were added over a 5 to 15 minute period. Upon cooling, 1.22% Octoate Z (17-19%) and 1.22% Silane A-189 (gamma-mercaptopropyltrimethoxy-silane) were added and mixed for 30 minutes. Use of the Lap Shear Method after aging seven days indicated an adhesion strength of 13.42 psi for the product.

Preparation Example 3

A third experiment was conducted in the manner of the first two experiments. However, for this final experiment a combination of 0.61% by weight Silane A1120 and 0.61% Silane A189 were added and mixed as a combination of silanes representing a combination of adhesion promoters. Studies of the final product after seven days of aging, carried out by the Lap Shear Method, indicated an adhesion strength of 42.88 psi. In comparing the adhesion strength of the product to that of the products of the first two experiments, the results indicate that a combination of components, particularly silanes, improved upon the adhesion strengths obtained through use of a single component.

While the preferred embodiments have been shown and described, it will be understood that there is no intent to limit the invention by such disclosure, but rather, is intended to cover all modifications and alternate constructions falling within the spirit and scope of the invention as defined in the appended claims.

The invention claimed is:

1. A composition adapted for use in the manufacture of insulating structures, comprising:
   an adhesion promoter comprised of a first component and a second component distinct from said first component, wherein the interaction between the first and second components increases adhesion properties;
   a polymeric base material;
   at least one cross linking agent; and
   wherein said adhesion promoter consists of a first component consisting of N-beta-(Aminoethyl)-gamma-aminopropyltrimethoxysilane, and the second component is selected from the group consisting of gamma-Mercaptopropyltrimethoxysilane and tris-[(3-Trimethoxysilyl)propyl] isocyanurate.

2. The composition according to claim 1, wherein the at least one cross linking agent is chosen from the group consisting of divalent metal oxides, divalent salts of organic fatty acids, organic fatty acids, zinc oxide, zinc stearate, stearic acid, zinc octoate, tin octoate, calcium stearate or a mixture thereof.

3. The composition according to claim 1, wherein the at least one cross linking agent is zinc octoate.

4. The composition according to claim 1, further including at least one filler, molecular sieve or plasticizer.

5. The composition according to claim 4, wherein the filler is an inert filler.

6. The composition according to claim 1, wherein the composition is a hot melt adhesive.

7. The composition according to claim 6 in which there is no molecular sieve present in the composition.

8. A method for improving the adhesion properties of a composition adapted for use in the manufacture of insulating structures, comprising:
   combining a polymeric base material, at least one cross linking agent, and an adhesion promoter comprised of a first component and a second component distinct from said first component in the composition, wherein the interaction between the first and second components increases adhesion properties, wherein said adhesion promoter consists of a first component consisting of N-beta- (Aminoethyl)-gamma-aminopropyltrimethoxysilane, and the second component is selected from the group consisting of gamma-Mercaptopropyltrimethoxysilane and tris-[(3-Trimethoxysilyl)propyl] isocyanurate.

9. The method according to claim 8, wherein the composition further includes at least one filler, molecular sieve or plasticizer.

10. The method according to claim 9, wherein the at least one filler is an inert filler.

11. The method according to claim 8, wherein the composition is a hot melt adhesive.

12. The method according to claim 11, in which there is no molecular sieve present in the composition.

13. An insulating glass structure, comprising:
   a first pane;
   a second pane;
   a sealant system positioned between the first and second panes, comprising:
      an adhesion promoter comprised of at least two components distinct from each other, wherein the interaction between the components increases adhesion properties;
      a polymeric base material;
      at least one cross linking agent; and
      wherein said adhesion promoter consists of a first component consisting of N-beta-(Aminoethyl)-gamma-aminopropyltrimethoxysilane, and the second component is selected from the group consisting of gamma-Mercaptopropyltrimethoxysilane and tris-[(3-Trimethoxysilyl) propyl] isocyanurate.

14. The insulating glass structure according to claim 13, wherein the sealant system is a sealant strip.

15. The insulating glass structure according to claim 13, wherein the sealant system is a hot melt adhesive.

16. The composition of claim 1, wherein the weight percent of N-beta-(Aminoethyl)-gamma-aminopropyltrimethoxysilane ranges between 0.3% and 2.40%; the weight percent of gamma-Mercaptopropyltrimethoxysilane ranges between 0.3% and 2.40%, and the weight percent of tris-[(3-Trimethoxysilyl)propyl] isocyanurate ranges between 0.24% and 1.20%.

17. The method of claim 8 wherein the adhesion promoter consists of a first component consisting of N-beta-(Aminoethyl)-gamma-aminopropyltrimethoxysilane with a weight percent ranging between 0.3% and 2.40%, and a second component selected from the group consisting of gamma-Mercaptopropyltrimethoxysilane, with a weight percent ranging between 0.3% and 2.40% and tris-[3-Trimethoxysilyl)propyl] isocyanurate with a weight percent between 0.24% and 1.20%.

18. The insulating glass structure of claim 13 wherein the adhesion promoter consists of a first component consisting of N-beta-(Aminoethyl)-gamma-aminopropyltrimethoxysilane with a weight percent ranging between 0.3% and 2.40%, and a second component selected from the group consisting of gamma-Mercaptopropyltrimethoxysilane with a weight percent ranging between 0.3% and 2.40% and tris-[(3-Trimethoxysilyl)propyl] isocyanurate with a weight percent ranging between 0.24% and 1.20%.

* * * * *